Dec. 18, 1956     O. J. MILLIKEN     2,774,435
LEVELING TRACTOR AND DRAWBAR CONSTRUCTION
Filed March 28, 1955     2 Sheets-Sheet 1

INVENTOR.
Owen J. Milliken
BY
Fish and Huff

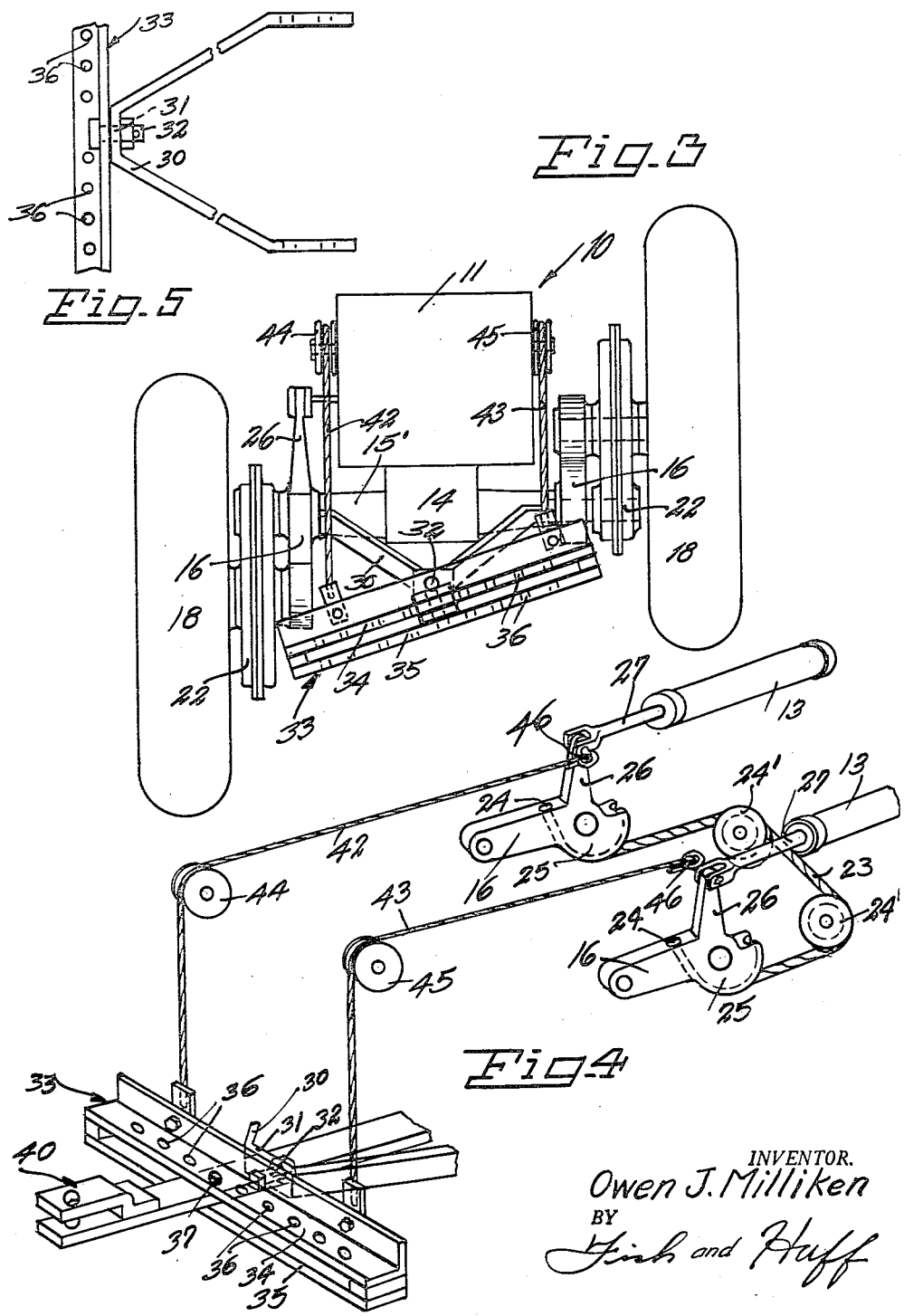

United States Patent Office 2,774,435
Patented Dec. 18, 1956

2,774,435

LEVELING TRACTOR AND DRAWBAR CONSTRUCTION

Owen J. Milliken, Connell, Wash., assignor of one-fourth to Arthur C. Johnson, Cunningham, Wash.

Application March 28, 1955, Serial No. 497,153

2 Claims. (Cl. 180—41)

This invention relates to tractors and more particularly to tractors having driving wheels which are adapted to move in vertical planes of the wheels to maintain the frame of the tractor in a substantially horizontal position.

One object of the invention lies in the provision of a tractor with driving wheels mounted in such manner that they may be vertically adjusted, and thus allow the tractor to be used upon level ground or driven transversely of a hill without likelihood of the tractor slipping and skidding down the hill instead of moving in a straight line across the pitch of the surface of the ground.

Another object of the invention lies in the provision of a tractor having driving wheels mounted for movement to selective vertical positions in the planes of the wheels by means of a hydraulic ram, powered winch or other powered device, and having a stabilizing mechanism uniting said wheels in a manner to insure commensurate opposed movements thereof relative to the frame and adapted to support the weight of the frame when the ram is not energized.

Another object of the invention is to provide a tractor having its rear drive wheels so mounted that vertical adjustments thereof may be accomplished by mechanism under control of the operator riding the tractor.

Another object of the invention lies in the provision in a tractor having a leveling frame of a drawbar mechanism adapted to maintain the drawbar hitch at substantially the same distance from the surface of the ground over which the tractor is operated, regardless of the pitch of the hill and the lateral placement of the drawbar.

These and other important objects of the invention will become apparent during the course of the following description.

In the accompanying drawings forming a part of this specification and in which like numerals are employed to designate like parts:

Figure 3 is a rear elevation of a tractor embodying the present invention and having the wheels disposed at different vertical levels as though the tractor were traversing a side hill;

Figure 4 is a diagrammatic perspective view of the mechanism mounting the wheels for vertical adjustments in their planes and actuating the drawbar mechanism; and Figure 5 is a fragmentary horizontal plan of a portion of the drawbar mechanism.

Figure 1:
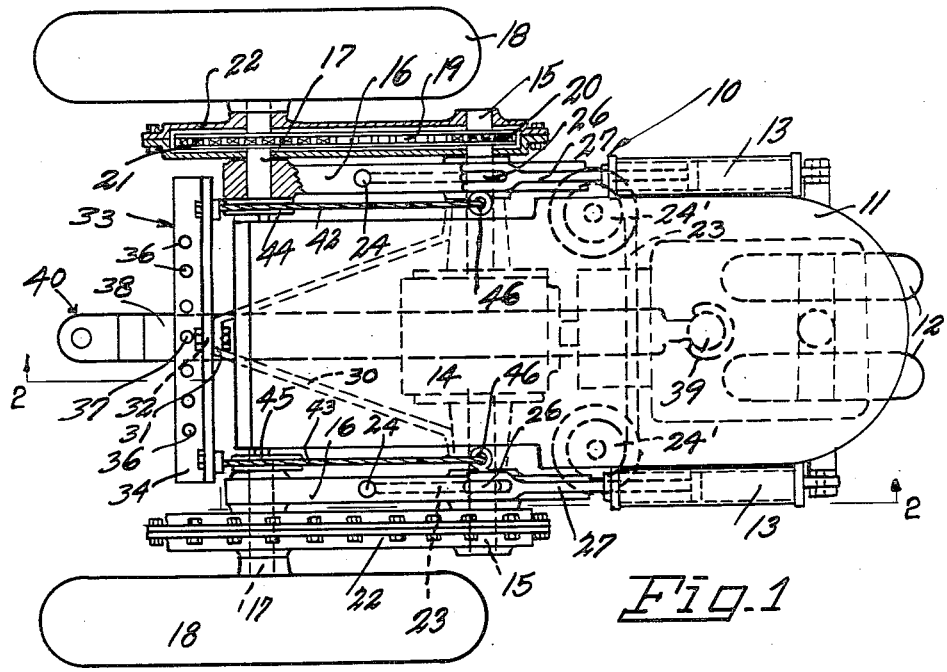
Figure 1 is a plan view of one physical embodiment of the present invention.

Referring now more particularly to the drawing in detail, I have shown a tractor indicated in general by the numeral 10 which has a body or frame 11. As is conventional, the frame is provided with the usual appurtenances (not shown) such as a seat for occupancy of the operator, driving motor, and the steering mechanism which is associated so that the front wheels 12 may be actuated to steer the tractor.

A conventional hydraulic system (not shown) is included as a part of the tractor and is adapted to operate hydraulic rams 13—13 which are controlled in the usual manner by means of manually operated valves (not shown).

The tractor may be provided with a conventional rear transmission 14 by means of which the driven axles 15 are powered, but instead of journaling the powered rear wheels on the axles 15, I provide rearwardly extending vertically tiltable arms 16 which carry the stub axles 17 at their outer ends in spaced parallel relation to the axles 15. The traction members or driving wheels 18—18 are carried by these axles 17 and are driven by means of chains 19 trained about sprockets 20 and 21 associated with the axles 15 and the wheels 18 respectively. A transmission housing 22 encloses each of the chains 19.

From the structure described thus far, it is obvious that the wheels 18 may be vertically shifted with relation to the frame 11 by rotating the arms 16 about the common axis of axles 15.

To enable the arms to support the frame 11, I provide a stabilizing mechanism which comprises a cable 23 having its ends 24—24 fixed to the arms 16 at any convenient location spaced from the axles 15 and relative to the axes of the wheels 18. This point of fixture may be located at the axes of wheels 18 if desired, or as shown in the drawing at a point intermediate the axles 17 and 15. This point of anchoring the cable 23 will vary with arms of various lengths and by the physical limitations of the structure with which it is employed.

Figure 2:
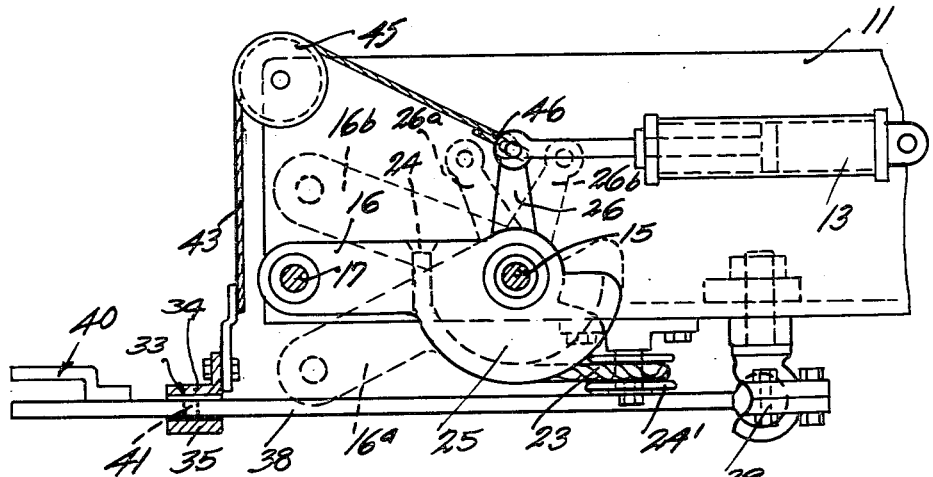
Figure 2 is a longitudinal vertical cross section taken on the planes of line 2—2 of Figure 1.

As shown in the drawing, the cable 23 is trained about a pair of laterally spaced pulleys 24' disposed on a horizontal plane and journaled on the frame 11 of the tractor 10. The cable 23 is of such length that when the arms 16 are parallel on a horizontal plane as seen in Figure 2, the cable is taut and supports the frame 11. It is also obvious in Figure 2 that the arms 16 are provided with segments of pulleys 25 rigidly united or integrally formed with the arms 16 to provide an annular groove in which the cable 23 may rest to prevent sharp bends and kinks in the cable.

The arms 16 are provided with actuating levers 26 which are here shown to extend upwardly at right angles to the arms 16, and at their upper ends are pivotally secured to the actuating rods 27 of the rams 13. Two rams 13—13 are disclosed in this physical embodiment of the invention. However, it will be understood that a single ram may be employed if desired. The rams are actuated, for example, to move the nearer lever 26 of Figure 2 to the broken line position shown at 26a. The arm 16 is thus moved to the broken line position shown at 16a. Obviously, the wheel 18 journaled on the axle 17 carried by said arm is lowered in its plane, and this causes the cable 23 to move longitudinally about the pulleys 24' and permits the opposed arm 16 to move to the broken line position disclosed in Figure 2 at 16b. This movement, of course, when two rams 13 are employed, is assisted by the far ram 13 by shifting the lever 26 to the broken line position shown in Figure 2 at 26b. The rear wheels are thus disposed vertically offset from each other in a manner similar to that seen in Figure 3, but in exactly the opposite position.

From this description, it will be apparent that the weight of the vehicle is not carried by the rams 13 during normal operation, but by means of the stabilizing mechanism including the associated cable 23. This admits of lower hydraulic pressures for operating the rams 13 than would be required were the rams required to support the frame 11 through the arms 16 and levers 26.

Also, in the present construction should a valve be found to leak, the frame 11 is not permitted to lower, whereas without the cable 23, this undesirable result would obtain should the ram pressure leak past its control valves.

In a leveling tractor of the type thus far described, it is required that the drawbar hitch be maintained at a constant height above the surface of the ground over which the tractor is operating, regardless of whether it is on the level or on a lateral incline. It is not always practical to hitch the agricultural implement directly at the transverse center of the tractor, as for example, is often found to be the case with plows, and yet if the drawbar were to shift laterally on a plane parallel to the plane of the frame 11 while the frame would maintain a horizontal position by the leveling device disclosed, the drawbar hitch when placed at one lateral extreme would be in near spaced relation to the ground surface, and when disposed at the opposed lateral extreme would be in far spaced relation from said surface. This would change the pitch on the agricultural implement and either cause it to dig too deeply or to come out of the soil.

I therefore provide automatic means for maintaining the height of the drawbar hitch at substantially the same distance from the ground surface, regardless of the lateral pitch of the ground.

To accomplish this foregoing function, I employ a wishbone structure 30 which is rigidly secured at its spaced forward ends to the axle housing 15' at opposite sides of the tractor 10. The wishbone mechanism 30 tapers rearwardly and terminates in a transverse portion 31 through which a pivot pin 32 is passed and pivotally supports at the transverse center of the tractor 10 a transversely extending vertically tiltable guide bar 33. The guide bar 33 is provided with spaced upper and lower elements 34 and 35 fixed together and having vertically aligned apertures 36 spaced along their full length and adapted to receive a drawbar anchoring pin 37 in selected vertically aligned pairs for the purpose subsequently described.

A drawbar 38 anchors forwardly at a point spaced rearwardly from the front end of the tractor by means of a ball and socket joint 39. This permits lateral and vertical swinging movements of the drawbar at its rear end where the hitch 40 is located. It will thus be seen that the drawbar hitch 40 may be shifted laterally of the tractor to a selected position, and may be fixed by passing pin 37 through a selected vertically spaced pair of apertures 3 in the guide bar 33 and aligned aperture 41 in the drawbar 38.

The guide bar 33 being tiltable about the pivot pin 32 may be disposed in parallel relation to the surface of the ground over which the tractor is traversing automatically by means of a laterally spaced pair of actuating cables 42 and 43 which are secured to the guide bar 33 at selected points inwardly spaced from its ends and extending upwardly over vertically disposed pulleys 44 and 45 journaled on the frame 11. From the pulleys 44 and 45 the cables extend forwardly to the upper ends of the levers 26 where they are anchored at 46. It will thus be seen that as the levers 26 are shifted by the rams 13, the cables 42 and 43 are alternately pulled and released to effect tilting movement of the guide bar 33. Regardless of the position of the hitch 40 of drawbar 38, it will thus be maintained at a predetermined spacing from the surface of the ground as defined.

Having thus described my invention, I claim:

1. In a leveling tractor the combination with a frame; a pair of power driven traction wheels supporting the tractor; manually controlled powered means for movement of the wheels to selective vertical positions in the planes of said wheels; and a taut cable having its ends anchored relative to the axes of said wheels and extending downwardly under and supporting said frame; of a laterally extending vertically tiltable guidebar journaled substantially at the lateral center of said tractor on a horizontal longitudinal axis; a drawbar pivotally united to said tractor spaced from its forward end, the rearward end of said drawbar being associated with and guided for lateral swinging movements by said guidebar; cables anchored adjacent to the ends of said guidebar extending upwardly over pulleys journaled on said frame and having their opposed ends fixed relative to the axes of said wheels, whereby the guidebar is maintained in substantially parallel relationship to the surface of the ground over which the tractor traverses.

2. In a leveling tractor the combination with a frame; a pair of power driven traction members disposed one on each side of the frame; manually controlled powered means operably interconnecting the traction members for supporting said frame and movable in substantially vertical planes to selective alternate vertical positions relative to the frame; of a laterally extending vertically tiltable guidebar journalled substantially at the lateral center of said tractor on a horizontal longitudinal axis; a drawbar pivotally united to said tractor spaced from its forward end, the rearward end of said drawbar being associated with and guided for lateral swinging movements by said guidebar; cables anchored adjacent to the ends of said guidebar extending upwardly over pulleys journaled on said frame and having their opposed ends fixed relative to the axes of said wheels, whereby the guidebar is maintained in substantially parallel relationship to the surface of the ground over which the tractor traverses.

References Cited in the file of this patent
UNITED STATES PATENTS

| | | |
|---|---|---|
| 1,765,788 | Daniel | June 24, 1930 |
| 2,208,600 | Ronning | July 23, 1940 |
| 2,656,668 | Witzel | Oct. 27, 1953 |